Dec. 5, 1939.   G. A. PADDOCK   2,182,500
CELL COVER ASSEMBLY FOR STORAGE BATTERIES
Filed April 26, 1938
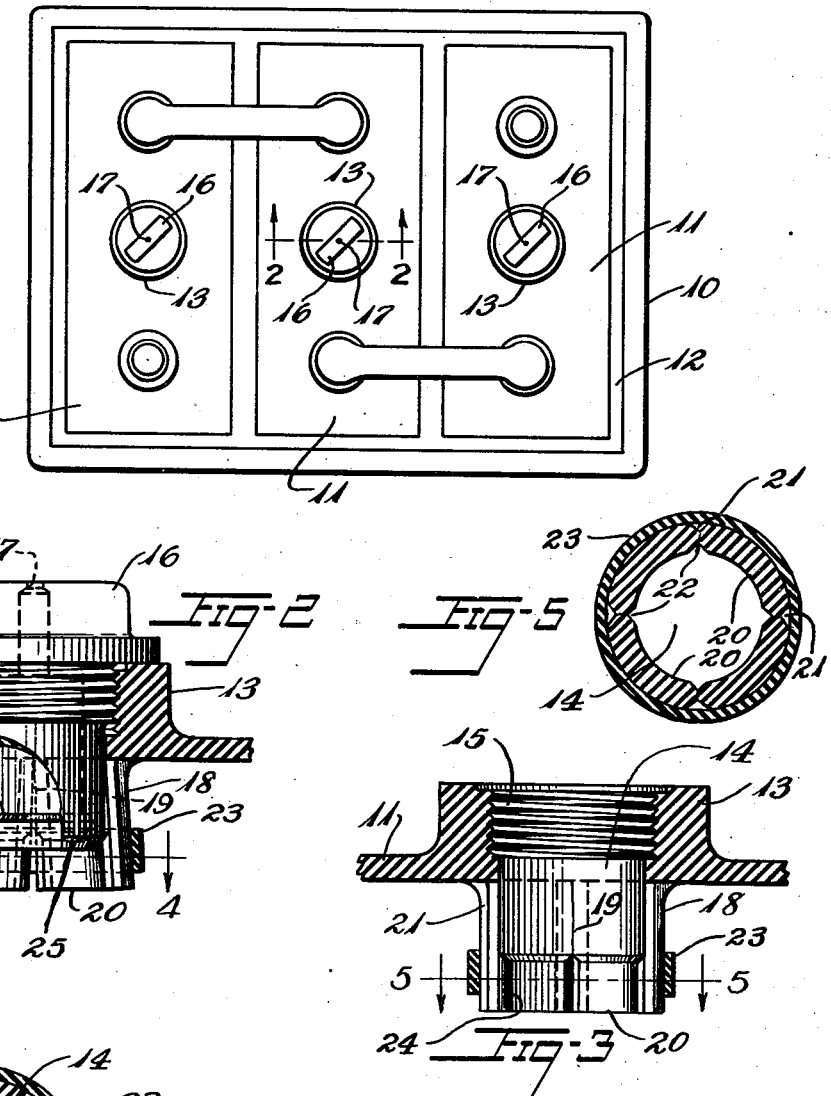
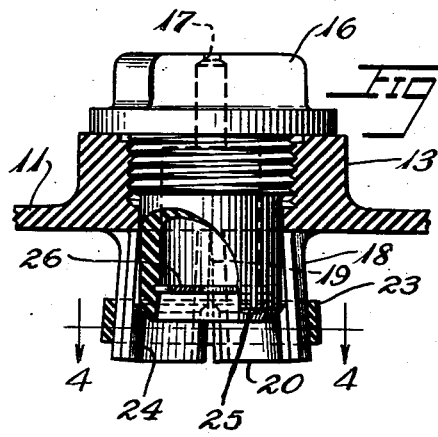
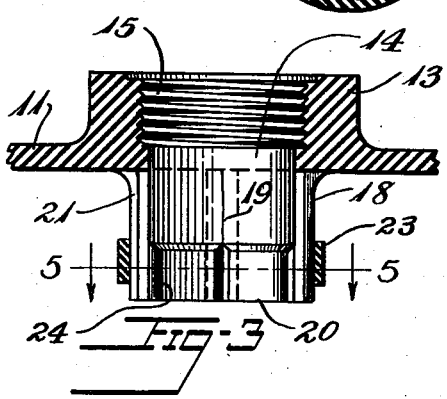
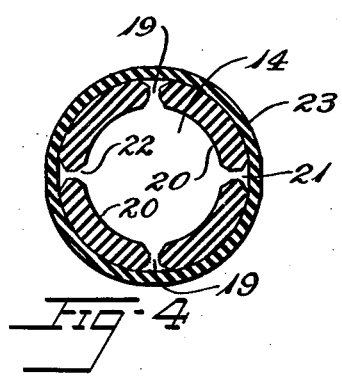

Patented Dec. 5, 1939

2,182,500

UNITED STATES PATENT OFFICE 2,182,500

CELL COVER ASSEMBLY FOR STORAGE BATTERIES

George A. Paddock, Stow, Ohio, assignor to The B. F. Goodrich Company, New York, N. Y., a corporation of New York Application April 26, 1938, Serial No. 204,342

4 Claims. (Cl. 136—178)

This invention relates to cell cover assemblies for storage batteries and is especially useful in storage batteries for use on motor vehicles.

Storage batteries employ corrosive sulfuric acid as an electrolyte. It is customary to provide the cells with acid resisting covers sealed to the containers. Provision is made for filling and testing the cells by a vent well formed in the cover and defining a filler opening. A vent plug is removably secured to the vent well. It is necessary to maintain a space for the escape of gas above the electrolyte and this is assured by extending the vent well downwardly from the cover to the desired fluid level. Where over filling occurs, acid is sprayed from the vent by ebullition of gas. This invention aims to provide improved means for venting the space above the electrolyte when the battery is in use and for automatically closing the vents when the battery is being filled.

The principal objects of the invention are to provide against over filling of the battery with electrolyte, to provide for venting the battery above the fluid level, and to provide simplicity of construction and resistance to corrosion. These and other objects will appear from the following description and the accompanying drawing.

Of the drawing:

Fig. 1 is a plan view of a three cell battery.

Fig. 2 is a vertical sectional view taken on line 2—2 of Fig. 1 and showing the filling and venting mechanism with the vent plug in place.

Fig. 3 is a similar view with the vent plug removed.

Fig. 4 is a section on line 4—4 of Fig. 2.

Fig. 5 is a section on line 5—5 of Fig. 3.

Referring to the drawing, the numeral 10 designates a battery container of the multiple cell type, having cell covers 11 secured thereto as by a bituminous seal 12. Each cell cover is formed with a vent well 13 defining a filler opening 14 and threaded as at 15 to receive a vent plug 16 having a vent 17 therein. The wall of the vent well is extended downwardly to the desired liquid level as a thin wall or skirt 18 which is split preferably in several places, as at 19, 19 to provide a plurality of abutting staves 20. To provide for separation of the staves, longitudinal grooves 21 are molded in the wall on the outside thereof and similar grooves 22 aligned therewith in the inner face of the wall to induce separation of the staves by weakening the material along the line of the grooves so that it will crack therealong under expanding force applied to the vent well. The staves are normally in contact and as they are ordinarily wet by the electrolyte, gas will not escape therethrough at pressures approximating atmospheric pressure. The invention contemplates separation of the staves to vent the space above the fluid except when the filler or vent plug is removed when it is desired that no gas escape through the wall 18. To hold the staves normally in assembled abutting relation, an elastic band 23, of soft vulcanized rubber or similar acid-resistance elastic material, is placed around the assembled staves under tension, being retained by friction. To provide for separation of the staves when the plug is in place, each stave is formed on its inner face near its lower end with a cam surface 24 extending inwardly therefrom, and the vent plug 16 is formed with a depending skirt 25 having its outer surface chamfered to engage the cam surfaces of the staves and to force the staves outwardly when the plug is in place. The arrangement is such that the staves flex outwardly from their place of attachment to the cell cover, thereby spreading open the crack therebetween, as clearly shown in Figs. 2 and 4. Upon removal of the vent plug for filling purposes the band 23 draws the staves into contact, as shown in Figs. 3 and 5.

The vent plug is hollowed on its under side and a baffle plate 26 is mounted therein to prevent direct throw of acid spray from the filler opening through the vent 17.

All of the parts, with the exception of the rubber band 23 are constructed of rigid acid-resisting plastic material, such as hard rubber. While each cell is shown as provided with a separate cell cover, the invention may be applied also to covers for a bank of cells.

These and other modifications of the invention may be made without departing from the invention as it is defined by the following claims:

I claim:

1. A cover assembly for a container for electrolyte comprising a cover having a vent and filling opening therethrough, and a skirt integral with the cover about the opening and depending below the cover for providing adjacent said skirt between the cover and a normal electrolyte level a gas-trapping space beneath the cover, said skirt having a portion flexibly mounted for a hinging movement with respect to an adjacent portion of the skirt from a closed gas-trapping position to separate the first said portion from the adjacent portion for providing a venting slit between the adjacent margins of said portions through the wall of the skirt, means for swinging the first said portion to separate it from said adjacent portion, and resilient means for urging the first said portion to its closed position.

2. A cover assembly for a container for electrolyte comprising a cover having a vent and filling opening therethrough, and a skirt integral with the cover about the opening and depending below the cover for providing adjacent said skirt between the cover and a normal electrolyte level a gas-trapping space beneath the cover, said skirt having a portion flexibly mounted for a hinging movement with respect to an adjacent portion of the skirt from a closed gas-trapping position to separate the first said portion from the adjacent portion for providing a venting slit between the adjacent margins of said portions through the wall of the skirt, means for swinging the first said portion to separate it from said adjacent portion, and resilient means for urging the first said portion to its closed position, said resilient means comprising an elastic body encompassing the skirt and holding its adjacent portions together.

3. A cover assembly for a container for electrolyte comprising a cover having a vent and filling opening therethrough, and a skirt integral with the cover about the opening and depending below the cover for providing adjacent said skirt between the cover and a normal electrolyte level a gas-trapping space beneath the cover, said skirt having a portion flexibly mounted for a hinging movement with respect to an adjacent portion of the skirt from a closed gas-trapping position to separate the first said portion from the adjacent portion for providing a venting slit between the adjacent margins of said portions through the wall of the skirt, means for swinging the first said portion to separate it from said adjacent portion, and resilient means for urging the first said portion to its closed position, said means for swinging the skirt portion comprising a vented closure plug adapted to engage the opening in the cover and constructed and arranged to press outwardly upon the movable skirt portion when engaged in said opening.

4. A cover assembly for a container for electrolyte comprising a cover having a vent and filling opening therethrough, and a skirt integral with the cover about the opening and depending below the cover for providing adjacent said skirt between the cover and a normal electrolyte level a gas-trapping space beneath the cover, said skirt comprising a plurality of staves having their margins normally abutting each other, said staves being flexibly mounted for a hinging movement with respect to the cover from a closed gas-trapping position to separate the staves for providing venting slits between the adjacent margins of the staves through the wall of the skirt, means for swinging the staves from the closed position to the venting position, and resilient means for urging the staves to their closed position, said means for swinging the staves comprising a vented closure plug adapted to engage the opening in the cover and constructed and arranged to press outwardly upon the staves when the plug is engaged in said opening.

GEORGE A. PADDOCK.